US012715777B2

(12) United States Patent
Alotaibi et al.

(10) Patent No.: US 12,715,777 B2
(45) Date of Patent: Aug. 25, 2026

(54) METHODS FOR MAKING ZEOLITE-Y PARTICLES

(71) Applicant: Saudi Arabian Oil Company, Dhahran (SA)

(72) Inventors: Faisal Alotaibi, Al-Khobar (SA); Lianhui Ding, Dhahran (SA); Mohammad F. Aljishi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 468 days.

(21) Appl. No.: 18/500,528

(22) Filed: Nov. 2, 2023

(65) Prior Publication Data

US 2025/0145479 A1 May 8, 2025

(51) Int. Cl.

| | |
|---|---|
| ***C01B 39/24*** | (2006.01) |
| ***B01J 6/00*** | (2006.01) |
| ***B01J 29/08*** | (2006.01) |
| ***B01J 37/06*** | (2006.01) |
| ***B01J 37/08*** | (2006.01) |

(52) U.S. Cl.

CPC ............... *C01B 39/24* (2013.01); *B01J 6/001* (2013.01); *B01J 29/084* (2013.01); *B01J 37/06* (2013.01); *B01J 37/08* (2013.01); *C01P 2004/60* (2013.01); *C01P 2006/12* (2013.01); *C01P 2006/14* (2013.01)

(58) Field of Classification Search

CPC . B01J 29/084; B01J 37/08; B01J 37/06; B01J 6/001; C01B 39/24; C01B 39/20

See application file for complete search history.

(56) References Cited

U.S. PATENT DOCUMENTS

| | | | | |
|---|---|---|---|---|
| 7,858,062 | B2 | 12/2010 | Larsen et al. | |
| 2002/0094931 | A1* | 7/2002 | Wang | B01J 29/08 502/63 |
| 2012/0117860 | A1* | 5/2012 | Brady | C10B 49/22 44/307 |

OTHER PUBLICATIONS

English translation of SE 439297. (Year: 1985).*

Ahmedzeki et al., "Synthesis and Characterization of Nanocrystalline Zeolite Y", Al-Khwarizmi Engineering Journal, vol. 12, No. 1, pp. 79-89, 2016.

Rasouli et al., "Effect of nanocrystalline zeolite Na-Y n meta-xylene separation", Microporous and Mesoporous Materials, vol. 152, pp. 141-147, 2012.

Wang et al., "Rapid and high yield synthesis method of colloidal nano faujasite", Microporous and Mesoporous Materials, vol. 230, pp. 89-99, 2016.

* cited by examiner

*Primary Examiner* — Zakiya W Bates

(74) *Attorney, Agent, or Firm* — Dinsmore & Shohl, LLP

(57) ABSTRACT

A method of making zeolite-Y particles may include dissolving a silica source material into a first solvent to form a first solution and dissolving an alumina source material into a second solvent to form a second solution. The method may also include combining the first solution with the second solution to form a combined mixture. The combined mixture may include a templating agent. The method may include aging the combined mixture for a time period of from 10 hours to 30 hours to form a zeolite precursor solution and heating the zeolite precursor solution at a temperature of from 50° C. to 70° C. to form an intermediate mixture. The method may include heating the intermediate mixture at a temperature of from 80° C. to 120° C. to form the zeolite-Y particles.

20 Claims, 1 Drawing Sheet

METHODS FOR MAKING ZEOLITE-Y PARTICLES

FIELD

The embodiments described herein generally relate to porous materials and, more particularly, to zeolites.

BACKGROUND

Materials that include pores, such as zeolites, may be utilized in many petrochemical industrial applications. For instance, such materials may be utilized as catalysts in a number of reactions that convert hydrocarbons or other reactants from feed chemicals to product chemicals. Zeolites may be characterized by a microporous structure framework type. Various types of zeolites have been identified over the past several decades, where zeolite types are generally described by framework types, and where specific zeolitic materials may be more specifically identified by various names such as ZSM-5 or zeolite-Y.

Zeolite containing catalysts and adsorbents have widespread uses in many diverse industries. Exemplary industries include the petrochemical industry in refinery, gas separation, and carbon dioxide separation and capture processes. In the petroleum industry, for example, zeolite containing catalysts may be included in processes such as fluid catalytic cracking (FCC) and hydrocracking to catalyze reactions such as hydrogenation, dehydrogenation, isomerization, alkylation, and cracking, for example. Zeolite containing adsorbents may be utilized in the separation of paraffins or aromatic isomers, and in drying processes to remove water and other impurities from hydrocarbon streams.

SUMMARY

Embodiments of the present disclosure are directed to methods of making zeolite-Y particles, where the zeolite-Y particles may have relatively small particles sizes (e.g., on the nano-sized scale as described herein). In particular, the methods of making zeolite-Y particles may comprise separately dissolving a silica source material and an alumina source material in separate solutions, and then combining these solutions. Moreover, the methods may utilize a crystallization process that utilizes two separate heat treatments. The combination of at least these features may allow for formation of zeolite-Y particles that have desired mesoporosity and/or relatively high uniformity of particle size, at least as compared with zeolites formed by conventional methods.

According to one or more embodiments, a method of making zeolite-Y particles may comprise dissolving a silica source material into a first solvent to form a first solution and dissolving an alumina source material into a second solvent to form a second solution. The method may also include combining the first solution with the second solution to form a combined mixture. The combined mixture may comprise a templating agent. The method may comprise aging the combined mixture for a time period of from 10 hours to 30 hours to form a zeolite precursor solution and heating the zeolite precursor solution at a temperature of from 50° C. to 70° C. to form an intermediate mixture. The method may comprise heating the intermediate mixture at a temperature of from 80° C. to 120° C. to form the zeolite-Y particles.

It is to be understood that both the preceding general description and the following detailed description describe various embodiments and are intended to provide an overview or framework for understanding the nature and character of the claimed subject matter. Additional features and advantages of the embodiments will be set forth in the detailed description and, in part, will be readily apparent to persons of ordinary skill in the art from that description, which includes the accompanying drawings and claims, or recognized by practicing the described embodiments. The drawings are included to provide a further understanding of the embodiments and, together with the detailed description, serve to explain the principles and operations of the claimed subject matter. However, the embodiments depicted in the drawings are illustrative and exemplary in nature, and not intended to limit the claimed subject matter.

BRIEF DESCRIPTION OF THE DRAWINGS

The following detailed description of specific embodiments of the present disclosure can be best understood when read in conjunction with the following drawings in which.

Figure 1A:
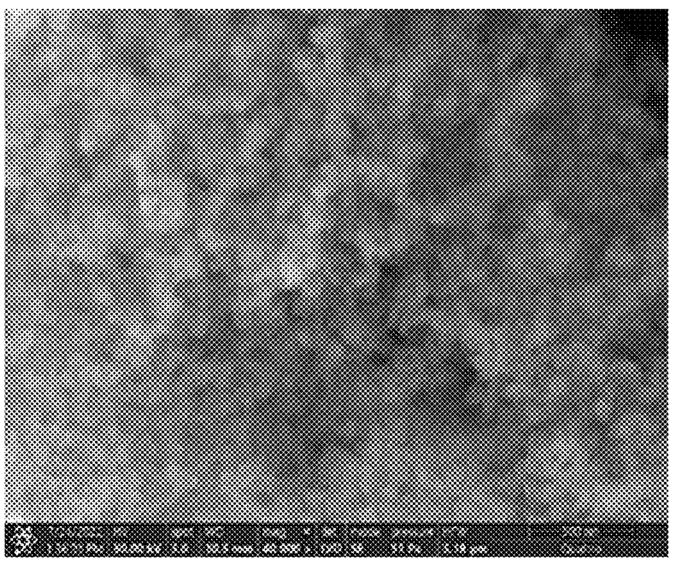
FIG. 1A depicts a micrograph of zeolite-Y particles, according to one or more embodiments described herein.

Reference will now be made in greater detail to various embodiments, some embodiments of which are illustrated in the accompanying drawings.

DETAILED DESCRIPTION

One or more embodiments presently described herein are directed to methods of making zeolite-Y particles. In some embodiments, the zeolite-Y particles are nano-sized, as described herein. The methods are described in detail hereinafter, along with properties and physical characteristics of the formed zeolite-Y particles.

As used throughout this disclosure, "zeolites" or "zeolite materials" generally refer to micropore-containing inorganic materials with regular intra-crystalline cavities and channels of molecular dimension, as would be understood by those skilled in the art. Zeolites generally comprise a crystalline structure, as opposed to an amorphous structure. The microporous structure of zeolites may render large surface areas and desirable size-/shape-selectivity, which may be advantageous for catalysis. Accordingly, zeolites may be utilized in many petrochemical industrial applications, such as, for instance, reactions that convert hydrocarbons or other reactants from feed chemicals to product chemicals by cracking.

Generally, zeolites may be characterized by a microporous framework type, which defines their microporous structure. Framework types are described in, for instance, "Atlas of Zeolite Framework Types" by Christian Baerlocher et al., Sixth Revised Edition, published by Elsevier, 2007, the teachings of which are incorporated by reference herein.

As described herein, the zeolites formed are zeolite-Y. Zeolite-Y generally comprises an FAU framework type. Zeolite-Y described herein may be characterized, in some embodiments, as ultra-stable zeolite-Y (USY). As used herein, "zeolite-Y" and "USY" refer to a zeolite having a FAU framework type according to the IZA zeolite nomenclature and consisting majorly of silica and alumina, as would be understood by one skilled in the art.

In one or more embodiments, a first solution may be formed and a second solution may be formed. The first solution may comprise at least a silica source material and a first solvent, and the second solution may comprise at least an alumina source material and a second solvent. The first solution may be formed by a process that comprises dissolving the silica source material into the first solution, and the second solution may be formed by a process that comprises dissolving the alumina source material into the second solution. Without limitation, the alumina source material may comprise one or more of $Al_2(SO_4)_3$, $Al(NO_3)_3$, $AlCl_3$, $NaAlO_2$, or $Al_2O_3$. Also, without limitation, the silica source material may comprise one or both of colloidal silica, fumed silica, or tetraethyl orthosilicate (TEOS), or $Na_2SiO_3$. It should be understood that molecules of source materials may disassociate in solution, and that the first solution and the second solution comprising an alumina source material or a silica source material may refer to the first or second solutions comprising the initial molecules of the source materials or disassociated components of these molecules. Without limitation, the first solvent and/or the second solvent may be water.

In one or more embodiments, the first solution and/or the second solution may further comprise a templating agent. As described herein, a "templating agent" may refer to a compound or compounds that self-assemble in a solution to form an ordered meso-structure from which a zeolite may crystallize around the templating agent structure to form a zeolite with the desired framework. According to some embodiments, the templating agent may be chosen from tetramethylammonium hydroxide, tetraethylammonium hydroxide, tetrapropylammonium hydroxide, tetraethylammonium bromide, and tetrapropylammonium bromide.

In one or more embodiments, the first solution, the second solution, or both may further comprise a basic compound. The basic compound may be chosen from NaOH, KOH, $Mg(OH)_2$, and the basic compound composition is not necessarily limited. It is believed that the presence of a basic compound, particularly in the second solution (including the alumina source material) may enhance the ability of the alumina source material to more fully dissolve into the second solvent.

In one or more embodiments, the first solution may be combined with the second solution to form a combined solution. Combining the first solution with the second solution may be by mixing together in the same container.

Without being bound by theory, it is believed that by forming separate solutions for the silica source material and the alumina source material, and then mixing the two solutions, may improve the uniformity of the combined mixture when compared to mixtures formed without using separate solutions for the silica source material and the alumina source material. This solution uniformity may beneficially affect the uniformity of zeolite nuclei formed from the solution, which may improve the uniformity of the zeolite-Y particles formed from the methods of the present disclosure when compared to zeolite-Y particles formed using methods that do not form separate solutions for the alumina source material and the silica source material.

According to one or more embodiments, the combined mixture (that includes the alumina source material and silica source material) may be aged to form the zeolite precursor solution. Aging may be for a period of time of from 10 hours to 30 hours, such as from 10 hours to 15 hours, from 15 hours to 20 hours, from 20 hours to 25 hours, from 25 hours to 30 hours, or any combination of one or more of these ranges. In some embodiments, aging may comprise stirring the mixture for a time period of from 15 hours to 25 hours. The aging may include agitating the mixture, such as stirring the mixture. In some embodiments, the aging may be at an elevated temperature, such as from 20° C. to 40° C., but in other embodiments the aging may be at ambient temperature such as about 25° C. Without being bound by theory, while it is not believed that the overall chemical composition substantially changes in the mixture during aging, it is believed that aging may form zeolite nuclei from which zeolitic particles may be formed in downstream steps by crystallization. In general, final crystal sizes may be smaller when more nuclei are formed during aging, and relatively small crystal size and particle size may be desired.

In one or more embodiments, the molar ratio of components in the zeolite precursor solution, may be 8-12 $Na_2O$: 1 $Al_2O_3$: 6-20 $SiO_2$: 3-10 TMAOH: 200-400 $H_2O$. Molar ratios of any two of these components are contemplated herein based on the described molar ratio of $Na_2O$, alumina, silica, and water.

Following the forming of the zeolite precursor solution, the zeolite precursor solution may be heated to form an intermediate mixture. According to one or more embodiments, the zeolite precursor solution may be heated at a temperature of at least 50° C. For example, the heating may be at a temperature of from 50° C. to 55° C., from 55° C. to 60° C., from 60° C. to 65° C., from 65° C. to 70° C., or any combination of one or more of these ranges. In one or more embodiments the heating may be for a time period of from 12 hours to 24 hours, such as from 12 hours to 14 hours, from 14 hours to 16 hours, from 16 hours to 18 hours, from 18 hours to 20 hours, from 20 hours to 22 hours, from 22 hours to 24 hours, or any combination of one or more of these ranges. In one or more embodiments, the zeolite precursor solution is not heated using microwave heating. Without being bound by theory, it is believed that by not using microwave heating the overall complexity of the zeolite synthesis may be reduced as microwave heating may require specialized containers and safety procedures that other forms of heating may not require.

Following the heating of the zeolite precursor solution to form the intermediate mixture, the intermediate mixture may be heated at a temperature of at least 50° C. For example, the intermediate mixture may be heated at a temperature of from 80° C. to 120° C., such as from 80° C. to 85° C., from 85° C. to 90° C., from 90° C. to 95° C., from 95° C. to 100° C., from 100° C. to 105° C., from 105° C. to 110° C., from 110° C. to 115° C., from 115° C. to 120° C., or any combination of one or more of these ranges. In one or more embodiments, the intermediate mixture may be heated for a time period of from 12 hours to 24 hours, such as from 12 hours to 14 hours, from 14 hours to 16 hours, from 16 hours to 18 hours, from 18 hours to 20 hours, from 20 hours to 22 hours, from 22 hours to 24 hours, or any combination of one or more of these ranges. In one or more embodiments, the intermediate mixture is not heated using microwave heating.

In one or more embodiments, the heating of the intermediate mixture solution forms the crystalized zeolite-Y particles in a residual liquid solution. In one or more embodiments, following the formation of the zeolite-Y particles in residual liquid solution, the zeolite-Y particles are separated from the residual liquid solution. Separation may be by a wide variety of techniques, and generally phase separation techniques may be suitable since the zeolite-Y particles are solids and the residual liquid solution is a liquid. For example, centrifugation may be utilized to separate the zeolite-Y particles from the residual liquid solution. Separation of the zeolite-Y particles may be complete or incomplete where, for example, some small amount of zeolite-Y particles remain in the residual liquid solution, but this is not desirably the case.

Following separation of the zeolite-Y particles from the residual liquid solution, the zeolite-Y particles may be washed and/or dried. Washing may be with water, and may be conducted until the pH of the zeolite-Y particles is from about 8 to 9. Drying may be by presence in ambient conditions or by heating, such as relatively low temperature heating. Following drying, the zeolite-Y particles may be calcinated by exposure to heat. The calcination may be performed by exposure to temperatures of from 300° C. to 500° C. for 4 to 10 hours.

As described herein, the zeolite-Y is formed as particles. The particles may be shaped particles, such as spheres, or may be inconsistent in shape or otherwise globular in shape, and shape of the particles is not necessarily limited in embodiments described herein. As described herein, the size of a particle refers to the maximum length of a particle from one side to another, measured along the longest distance of the particle. For example, a spherically shaped particle has a size equal to its diameter, or a rectangular prism shaped particle has a maximum length equal to the hypotenuse stretching from opposite corners. Particle size may be measured by a variety of known techniques such as laser diffraction analysis or microscopy. In one or more embodiments, the zeolite-Y particles may be nano-sized meaning that they have an average particle size of less than 1 micron. In some embodiments, the zeolite-Y particles may have an average diameter of from 30 nm to 100 nm, such as from 30 nm to 40 nm, from 40 nm to 50 nm, from 50 nm to 60 nm, from 60 nm to 70 nm, from 70 nm to 80 nm, from 80 nm to 90 nm, from 90 nm to 100 nm, or any combination of one or more of these ranges. In further embodiments, greater than 95% of the zeolite-Y particles formed from the method have a particle size of from 30 nm to 100 nm, such as from 30 nm to 40 nm, from 40 nm to 50 nm, from 50 nm to 60 nm, from 60 nm to 70 nm, from 70 nm to 80 nm, from 80 nm to 90 nm, from 90 nm to 100 nm, or any combination of one or more of these ranges.

In one or more embodiments, the zeolite-Y particles described may include, in addition to micropores (present in the microstructure of a zeolite), mesopores, and the zeolite-Y particles may be mesoporous by having an average pore size of greater than 2 nm and less than or equal to 50 nm. Unless otherwise described herein, the "pore size" of a material refers to the average pore size, but materials may additionally include mesopores having a particular size that is not identical to the average pore size. The average pore size of a material can be measured using BET analysis, as is widely understood to those in the art. According to one or more embodiments, the zeolite-Y particles may have an average pore size of greater than 1.5 nm, such as from 1.5 nm to 5 nm, such as from 1.5 nm to 2 nm, from 2 nm to 2.5 nm, from 2.5 nm to 3 nm, from 3 nm to 3.5 nm, from 3.5 nm to 4 nm, from 4 nm to 4.5 nm, from 4.5 nm to 5 nm, or any combination of one or more of these ranges.

In one or more embodiments, the zeolite-Y may have an average micropore volume and/or an average mesopore volume, where the total pore volume is the sum of these two. The mesopore and micropore volumes may be calculated according to the Barrett-Joiner-Halenda (BJH) method of determining mesopore volume known to one having skill in the art. Details regarding the t-plot method and the BJH method of calculating micropore volume and mesopore volume respectively are provided in Galarneau et al., "Validity of the t-plot Method to Assess Microporosity in Hierarchical Micro/Mesoporous Materials", Langmuir 2014, 30, 13266-13274, for example. In one or more embodiments, the zeolite-Y particles may have a total pore volume of from 0.5 ml/g to 1 ml/g, such as from 0.5 ml/g to 0.55 ml/g, from 0.55 ml/g to 0.6 ml/g, from 0.6 ml/g to 0.65 ml/g, from 0.65 ml/g to 0.7 ml/g, from 0.7 ml/g to 0.75 ml/g, from 0.75 ml/g to 0.8 ml/g, from 0.8 ml/g to 0.85 ml/g, from 0.85 ml/g to 0.9 ml/g, from 0.9 ml/g to 0.95 ml/g, from 0.95 ml/g to 1 ml/g, or any combination of one or more of these ranges. In one or more embodiments, the zeolite-Y particles may have a total mesopore volume of from 0.7 ml/g to 0.9 ml/g, such as from 0.7 ml/g to 0.72 ml/g, from 0.72 ml/g to 0.74 ml/g, from 0.74 ml/g to 0.76 ml/g, from 0.76 ml/g to 0.78 ml/g, from 0.78 ml/g to 0.8 ml/g, from 0.8 ml/g to 0.82 ml/g, from 0.82 ml/g to 0.84 ml/g, from 0.84 ml/g to 0.86 ml/g, from 0.86 ml/g to 0.88 ml/g, from 0.88 ml/g to 0.9 ml/g.

In one or more embodiments, the zeolite-Y particles may have an average surface area of at least 600 $m^2/g$, such as at least 650 $m^2/g$, at least 700 $m^2/g$, or even at least 750 $m^2/g$, as determined through the Brunauer-Emmett-Teller (BET) method (average BET surface area). In one or more embodiments, the zeolite-Y particles may have an average surface area of from 600 $m^2/g$ to 800 $m^2/g$, such as from 600 $m^2/g$ to 650 $m^2/g$, from 650 $m^2/g$ to 700 $m^2/g$, from 700 $m^2/g$ to 750 $m^2/g$, from 750 $m^2/g$ to 800 $m^2/g$, or any combination of one or more of these ranges.

As described herein, crystallinity is a measurement of the degree of structural order in a solid. A more crystalline solid will have its atoms and molecules arranged in a more regular and periodic manner than a less crystalline solid. Crystallinity is typically determined by x-ray diffraction. A particular diffraction peak can be selected and its intensity normalized. Zeolites can be analyzed and the diffraction intensity normalized against the standard producing a relative crystallinity based on a standard zeolite structure. In one or more embodiments, the zeolite-Y particles may have a relative crystallinity based on the crystallinity of CBV-100, available from Zeolyst International, of greater than 80%.

The zeolite-Y particles described herein may be utilized alone or in combination with other materials as catalyst used in hydrocracking processes. Such a process may have at least two functions: cracking of high molecular weight hydrocarbon and hydrogenating the unsaturated molecules. However, the relatively small pore size (e.g. average pore size less than 2 nm) of most conventional zeolites Y materials in hydrocracking catalysts generally does not favor the transport of large molecules in heavy oil fractions to diffuse into the active sites located inside the zeolite. This may cause low activity, and a possible deactivation of the catalyst. Additionally, the poor diffusion efficiency of bulky molecules can be avoided by reduced zeolite particle size due to increased external surface area and shortened diffusion path of the molecules. However, the relatively small particle size of the presently disclosed zeolite-Y materials may enable for better access of reactive molecules to catalytic sites.

EXAMPLES

The various embodiments of methods described will be further clarified by the following examples. The examples are illustrative in nature, and should not be to limit the subject matter of the present disclosure.

Comparative Example 1 (CE-1)

First 6.800 g of sodium hydroxide (NaOH) was stirred and dissolved in 39.24 g of water in a glass bottle. To this mixture 1.640 g of sodium aluminate ($NaAlO_2$) and 21.00 g of 40 wt. % colloidal silica was added and stirred for 1 hour. The mixture was then stirred and aged at 30° C. for 20 hours. The resulting hydrogel mixture was crystallized in a first stage at 60° C. for 12 hours, then temperature was increased to 100° C. for 12 hours at a second stage. The obtained mixture was filtrated and washed with water until its pH reached between 8 and 9. The resulting solid product was then dried at 110° C. for 24 hours and then calcinated at 500° C. for 4 hours (2° C./min ramp).

Example 1 (EX-1)

First, a solution was prepared by adding 6.800 g of NaOH to 20.06 g of water and stirring till dissolved. To this mixture 1.640 g of $NaAlO_2$ was added and stirred for 30 minutes. Then, 12.76 g of tetramethylammonium hydroxide (TMAOH) (25 wt. % in water) was added and stirred into the mixture for 30 minutes. Secondly, to prepare an additional solution TMAOH (25 wt. % in water) and 21.00 g of 40 wt. % colloidal silica were added and mixed together for 30 minutes. Then, the two solutions were slowly added together and stirred for 1 hour. The resulting mixture was then stirred and aged at 30° C. for 20 hours. The resulting hydrogel mixture was crystallized in a first stage at 60° C. for 12 hours, then the temperature was increased to 100° C. for 12 hours at a second stage. The obtained mixture was filtrated and washed with water until its pH reached between 8 and 9. The resulting solid product was then dried at 110° C. for 24 hours and then calcinated at 500° C. for 4 hours (2° C./min).

TABLE 1

Main Properties of CE-1 and EX-1

| Sample Name | CE-1 | EX-1 |
|---|---|---|
| Average particle sizes, nm | 200.0 | 66.2 |
| Crystallinity % | 100.0 | 90.0 |
| Bulk Si/Al, mol/mol | 1.90 | 1.50 |
| Framework Si/Al, mol/mol | 1.80 | 1.50 |
| Total surface area, $m^2/g$ | 629 | 614 |
| Micropore surface area, $m^2/g$ | 563 | 497 |
| Mesopore surface area, $m^2/g$ | 66.0 | 117.0 |
| Total pore volume, ml/g | 0.720 | 1.10 |
| Micro pore volume, ml/g | 0.300 | 0.280 |
| Mesopore volume, ml/g | 0.420 | 0.820 |
| Pore size, nm | 4.60 | 7.14 |
| Solid product Yield, wt % | 43.9 | 43.9 |

FIG. 1A, depicts the zeolite of EX-1 and the average particle size of the zeolite was determined using a scanning electron microscope.

Figure 1B:
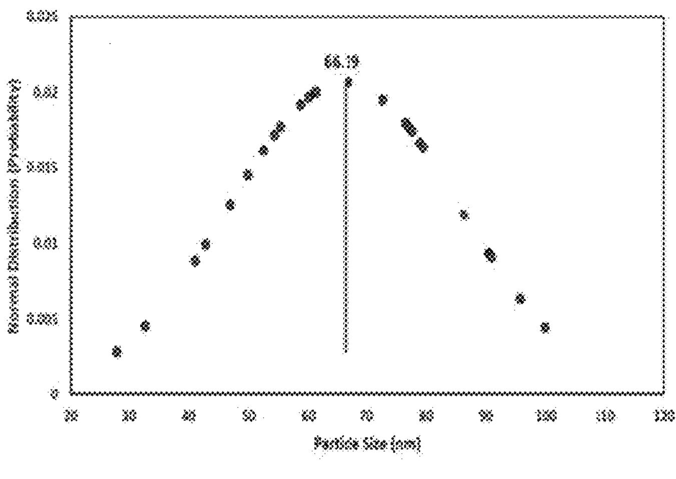
FIG. 1B graphically depicts the size distribution of zeolite-Y particles, according to one or more embodiments described herein.

FIG. 1B depicts the distribution of particle sizes in the zeolite-Y particles produced in EX-1, with the average particle size being 66.2 nm and all particles being between 30 nm and 100 nm in diameter. FIG. 1B, shows that the method of EX-1 can be used to form zeolite-Y particles within a narrow range of particle sizes improving the uniformity of the zeolite-Y particles. Further, as seen in Table 1, the zeolite of EX-1 had significantly improved mesopore volume when compared to the zeolite of CE-1.

The present disclosure includes numerous aspects. One aspect is a method of making zeolite-Y particles, the method comprising: dissolving a silica source material into a first solvent to form a first solution; dissolving an alumina source material into a second solvent to form a second solution; combining the first solution with the second solution to form a combined mixture, wherein the combined mixture comprises a templating agent; aging the combined mixture for a time period of from 10 hours to 30 hours to form a zeolite precursor solution; heating the zeolite precursor solution at a temperature of from 50° C. to 70° C. to form an intermediate mixture; and heating the intermediate mixture at a temperature of from 80° C. to 120° C. to form the zeolite-Y particles.

Another aspect is any above aspect or combination of aspects, wherein the templating agent is one or more of tetramethylammonium hydroxide, tetraethylammonium hydroxide, tetrapropylammonium hydroxide, tetraethylammonium bromide, and tetrapropylammonium bromide.

Another aspect is any above aspect or combination of aspects, wherein the first solution comprises tetramethylammonium hydroxide, water, and the silica source material.

Another aspect is any above aspect or combination of aspects, wherein the second solution comprises the tetramethylammonium hydroxide, the alumina source material, water, and a basic compound.

Another aspect is any above aspect or combination of aspects, wherein the basic compound is NaOH.

Another aspect is any above aspect or combination of aspects, wherein aging the mixture comprises stirring the mixture at a temperature of from 20° C. to 40° C. for a time period of from 15 hours to 25 hours.

Another aspect is any above aspect or combination of aspects, wherein the zeolite precursor solution is heated for a time period of from 12 hours to 24 hours.

Another aspect is any above aspect or combination of aspects, wherein the intermediate mixture is heated for a time period of from 12 hours to 24 hours.

Another aspect is any above aspect or combination of aspects, wherein the alumina source material is chosen from one or more of, $Al_2(SO_4)_3$, $Al(NO_3)_3$, $AlCl_3$, $NaAlO_2$, or $Al_2O_3$.

Another aspect is any above aspect or combination of aspects, wherein the silica source material is chosen from one or more of colloidal silica, fumed silica, tetraethyl orthosilicate, or $Na_2SiO_4$.

Another aspect is any above aspect or combination of aspects, wherein one or both of the zeolite precursor solution and the intermediate mixture are not heated using microwave heating.

Another aspect is any above aspect or combination of aspects, wherein the zeolite-Y particles have an average particle size of from 30 nm to 100 nm.

Another aspect is any above aspect or combination of aspects, wherein greater than 95% of the zeolite-Y particles have a particle size of from 30 nm to 100 nm.

Another aspect is any above aspect or combination of aspects, wherein the zeolite-Y particles have an average pore size of from 6 nm to 8 nm.

Another aspect is any above aspect or combination of aspects, wherein the zeolite-Y particles have a total pore volume of from 0.5 ml/g to 1 ml/g.

Another aspect is any above aspect or combination of aspects, wherein the zeolite-Y particles have a total mesopore volume of from 0.7 ml/g to 0.9 ml/g.

Another aspect is any above aspect or combination of aspects, wherein the zeolite-Y particles have an average surface area of at least 600 $m^2/g$.

Another aspect is any above aspect or combination of aspects, wherein the zeolite-Y particles have an average surface area of from 600 $m^2/g$ to 800 $m^2/g$.

Another aspect is any above aspect or combination of aspects, wherein the zeolite-Y particles have a relative crystallinity of greater than 80%. Another aspect is any above aspect or combination of aspects, wherein the method further comprises: washing the zeolite-Y particles; drying the zeolite-Y particles; and calcinating the zeolite-Y particles.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a stream or in a reactor should be appreciated as containing, in some embodiments, a mixture of isomers of that constituent. For example, a compositional range specifying butene may include a mixture of various isomers of butene. It should be appreciated that the examples supply compositional ranges for various streams, and that the total amount of isomers of a particular chemical composition can constitute a range.

What is claimed is:

1. A method for making zeolite-Y particles, the method comprising:

dissolving a silica source material into a first solvent to form a first solution;

dissolving an alumina source material into a second solvent to form a second solution;

combining the first solution with the second solution to form a combined mixture, wherein the combined mixture comprises a templating agent;

aging the combined mixture for a time period of from 10 hours to 30 hours to form a zeolite precursor solution;

heating the zeolite precursor solution at a temperature of from 50° C. to 70° C. to form an intermediate mixture; and heating the intermediate mixture at a temperature of from 80° C. to 120° C. to form the zeolite-Y particles.

2. The method of claim 1, wherein the templating agent is one or more of tetramethylammonium hydroxide, tetraethylammonium hydroxide, tetrapropylammonium hydroxide, tetraethylammonium bromide, and tetrapropylammonium bromide.

3. The method of claim 1, wherein the first solution comprises tetramethylammonium hydroxide, water, and the silica source material.

4. The method of claim 1, wherein the second solution comprises the tetramethylammonium hydroxide, the alumina source material, water, and a basic compound.

5. The method of claim 4, wherein the basic compound is NaOH.

6. The method of claim 1, wherein aging the mixture comprises stirring the mixture at a temperature of from 20° C. to 40° C. for a time period of from 15 hours to 25 hours.

7. The method of claim 1, wherein the zeolite precursor solution is heated for a time period of from 12 hours to 24 hours.

8. The method of claim 1, wherein the intermediate mixture is heated for a time period of from 12 hours to 24 hours.

9. The method of claim 1, wherein the alumina source material is chosen from one or more of, $Al_2(SO_4)_3$, $Al(NO_3)_3$, $AlCl_3$, $NaAlO_2$, or $Al_2O_3$.

10. The method of claim 1, wherein the silica source material is chosen from one or more of colloidal silica, fumed silica, tetraethyl orthosilicate, or $Na_2SiO_4$.

11. The method of claim 1, wherein one or both of the zeolite precursor solution and the intermediate mixture are not heated using microwave heating.

12. The method of claim 1, wherein the zeolite-Y particles have an average particle size of from 30 nm to 100 nm.

13. The method of claim 1, wherein greater than 95% of the zeolite-Y particles have a particle size of from 30 nm to 100 nm.

14. The method of claim 1, wherein the zeolite-Y particles have an average pore size of from 6 nm to 8 nm.

15. The method of claim 1, wherein the zeolite-Y particles have a total pore volume of from 0.5 ml/g to 1 ml/g.

16. The method of claim 1, wherein the zeolite-Y particles have a total mesopore volume of from 0.7 ml/g to 0.9 ml/g.

17. The method of claim 1, wherein the zeolite-Y particles have an average surface area of at least 600 $m^2/g$.

18. The method of claim 1, wherein the zeolite-Y particles have an average surface area of from 600 $m^2/g$ to 800 $m^2/g$.

19. The method of claim 1, wherein the zeolite-Y particles have a relative crystallinity of greater than 80%.

20. The method of claim 1, further comprising:

washing the zeolite-Y particles;

drying the zeolite-Y particles; and calcinating the zeolite-Y particles.

* * * * *